United States Patent [19]

Gross

[11] Patent Number: 5,106,039
[45] Date of Patent: Apr. 21, 1992

[54] KEYED UNIVERSAL MOUNTING KIT FOR MOUNTING A RADIO IN AN AUTOMOTIVE DASHBOARD

[75] Inventor: Charles B. Gross, Deleon Springs, Fla.

[73] Assignee: Metra Electronics Corporation, Holly Hill, Fla.

[21] Appl. No.: 616,069

[22] Filed: Nov. 20, 1990

[51] Int. Cl.⁵ .................................................. G12B 9/00
[52] U.S. Cl. ...................................................... 248/27.1
[58] Field of Search ............ 248/27.1, 27.3, 542, 248/544, 558, 674, 675, 201, 224.4, 300, 911, 909, 906; 312/7.1; 403/403, 382, 205; 220/3.5, 3.6, 3.9; 174/58; 361/417, 419, 422, 427; 455/345

[56] References Cited

U.S. PATENT DOCUMENTS

| | | | |
|---|---|---|---|
| 1,509,288 | 9/1924 | Fralick | 248/906 |
| 1,718,878 | 6/1929 | Raquette | 248/300 |
| 4,062,470 | 12/1977 | Boteler | 248/27.1 |
| 4,455,007 | 6/1984 | Varon | 248/300 |
| 4,462,564 | 7/1984 | Alves | |
| 4,466,595 | 8/1984 | O'Connor | 248/558 |
| 4,560,124 | 12/1985 | Alves | 248/27.1 |
| 4,673,149 | 6/1987 | Grote | 248/27.1 |
| 4,699,341 | 10/1987 | Ponticelli | 248/27.1 |
| 4,738,420 | 4/1988 | Angle | 455/345 |
| 4,742,978 | 5/1988 | Ponticelli | 312/7.1 |
| 4,868,715 | 9/1989 | Putman et al. | 361/422 |
| 4,895,326 | 1/1990 | Nimpoeno | 312/7.1 |
| 4,911,386 | 3/1990 | Putman | 312/7.1 |

OTHER PUBLICATIONS

1990 AI Catalogue, p. 38, Instruction Booklet for GM-K44 General Motors Radio Installation Kit.
AI 1990 Catalogue, p. 58.
Scosche 1990 Catalogue, p. 3.
Realistic Catalogue No. 12-1361, Manual for In-Dash Installation Kit For 1982-88 General Motors Vehicles (1988).

Primary Examiner—Ramon O. Ramirez
Assistant Examiner—Robert A. Olson
Attorney, Agent, or Firm—Fitzpatrick, Cella, Harper & Scinto

[57] ABSTRACT

A universal keyed mounting kit for mounting a radio or the like to support brackets in the vehicle includes at least one mounting bracket member having a hole therein for attachment to the radio. The mounting bracket has a plurality of apertures each for passing therethrough a locking bracket. Each aperture includes a key structure for matching with a key structure on the locking bracket. A plurality of locking brackets are provided, each for passing through a corresponding aperture of the mounting bracket from a radio side of the mounting bracket to an outside thereof. Each locking member has a key structure for engaging the key structure of the corresponding mounting bracket. This eliminates the need for screws, nuts and bolts, glue, etc. for fixing the locking brackets to the mounting brackets. Preferably, the mounting brackets have a plurality of apertures at different angles so that the mounting bracket may be adapted to a wide variety of vehicle models.

20 Claims, 3 Drawing Sheets

KEYED UNIVERSAL MOUNTING KIT FOR MOUNTING A RADIO IN AN AUTOMOTIVE DASHBOARD

BACKGROUND OF THE INVENTION

The present invention is directed to a mounting assembly for mounting a radio or the like in the dashboard of a vehicle, and particularly to a mounting assembly which is keyed in order to provide quick and secure mounting with the minimum use of tools. Preferably, the mounting kit according to the present invention is universal and can be adapted to a wide variety of vehicle types and models.

It is well known that radio installation shops and automobile owners themselves install a wide variety of electronic components in their own vehicles. A large industry has been spawned to supply these installation kits to ensure an easy and successful installation. Of particular note are those installation kits which may be used with a wide variety of automobile models thus achieving efficiency in the design and manufacture of such kits, and reducing inventory requirements of retailers and installation shops.

In use, the mounting brackets which comprise the installation kit are first affixed to the electronic component (e.g., radio tuner, compact disc player, tape player, etc.) using screws or nuts and bolts. Then, the mounting brackets are affixed to corresponding brackets within the dashboard of the vehicle. Since the location and configuration of the dashboard vary from vehicle to vehicle, each mounting bracket must be customized for the particular vehicle into which the component is to be installed. In the prior art, this customization has been accomplished by coupling intermediate brackets between the radio mounting bracket and the vehicle bracket.

One mounting assembly of the above-described type is disclosed in U.S. Pat. No. 4,738,420. According to this disclosure, such intermediate brackets are affixed to one of a plurality of different holes on the radio mounting bracket using a nut and bolt assembly. This way, the intermediate bracket may be located at any desired position and then fixed using a nut and a bolt provided with the kit. This structure has the disadvantage that the nut and bolt may vibrate loose due to vehicular motion, resulting in a loose installation and possible radio or vehicle damage. Another problem is that an installation kit containing a great number of nuts and bolts is expensive to manufacture, transport, and sell.

U.S. Pat. No. 4,895,326 discloses another known type of installation kit wherein the intermediate bracket includes a plurality of tabs designed to be coupled to different vehicle mounting brackets. In use, the tabs which are not needed are broken away. However, the intermediate brackets must still be affixed to the radio mounting bracket with a nut and bolt assembly with the inherent disadvantages described above. Another installation kit incorporating the break-away intermediate bracket technique is described in U.S. Pat. No. 4,560,124. U.S. Pat. No. 4,911,386 discloses yet another installation kit wherein the intermediate bracket is coupled to the radio bracket with a nut and bolt assembly.

U.S. Pat. Nos. 4,699,34 and 4,742,978 describe installation kits which avoid the necessity for a nut and bolt assembly to couple the intermediate bracket to the radio bracket. In U.S. Pat. No. 4,699,341, the radio bracket includes a plurality of paired slots, and the intermediate bracket includes a pair of tabs dimensioned to snap-fit into the paired slots on the radio bracket. Unfortunately, vehicular vibration may cause the tabs to move out of the slots thus causing an abrupt dismounting of the radio in the dashboard, and the tabs themselves are quite easily broken. An improvement is described in U.S. Pat. No. 4,742,978 wherein each intermediate bracket includes a pair of hook-like segments adapted to hook within paired recesses on the radio bracket. The paired hooks and the paired recesses are provided on orthogonal planes of the brackets to ensure a secure fit. However, the entire weight of the radio must be borne by the hook-like segments thus inducing deformation or breakage of those segments. Also, these intermediate brackets can be installed only at the corners of the radio bracket thus severely limiting the number of vehicles in which such a kit may be used. Vehicle mounting brackets are known to extend all along the four surfaces of the dashboard opening.

Thus, what is needed is a universal vehicle installation kit capable of securely and permanently fixing a radio in a vehicle dashboard, wherein the kit comprises the fewest number of parts, is easy to manufacture, transport, and sell, and wherein the vehicle owner can install the radio into his/her vehicle quickly and easily.

SUMMARY OF THE INVENTION

The present invention provides a universal installation kit for installing a radio into a vehicle dashboard. In its preferred embodiment, the invention comprises basically two types of parts. A mounting bracket is adapted to be fixed to the radio and includes a keyed opening such as a recess on a radio side of the mounting bracket. An intermediate (or locking) bracket is provided for coupling the mounting bracket to the vehicle. The locking bracket is pushed through the mounting bracket from the inside to the outside thereof and includes a key structure adapted to mate to a corresponding key structure in the mounting bracket. Thus, nuts and bolts are not required, parts do not have to be broken away, and a secure and permanent installation is achieved since the intermediate bracket is held tightly in place by the radio itself and the key structure.

According to one aspect of the present invention, a keyed mounting kit for mounting a radio or the like to support brackets in a vehicle comprises at least one bracket member having a hole therein for attachment to the radio. The bracket has a plurality of apertures each for passing therethrough a locking member, each aperture including a key recess for mating with a key structure on the locking member. A plurality of locking members are provided, each for passing through a corresponding aperture of the bracket member from a radio side thereof to an outside thereof. Each locking member has a key structure for mating with the key recess of a corresponding bracket member.

According to a further aspect of the present invention, apparatus for mounting a communications device or the like to a vehicle comprises a substantially planar mounting bracket having a hole therein for connection to the device. The mounting bracket has a plurality of openings each capable of passing therethrough a locking bracket. Each opening has a through portion and a recessed portion, the recessed portion being disposed on a radio side of the mounting bracket. At least one locking bracket is included and has a hole therein for connection to the vehicle. The locking bracket has (a) an extending portion for passing through the through portion of said opening, and (b) a locking portion for mating with the recessed portion of the opening.

According to yet a further aspect of the present invention, a universal mounting kit for mounting an electronics component to a plurality of different vehicle types includes a plurality of substantially planar mounting brackets, each mounting bracket having a plurality of openings located to couple the bracket to at least two different vehicle types. Each aperture has (a) a through hole, and (b) a recessed portion on a component side of the bracket. A plurality of locking brackets are provided, each locking bracket having (a) a substantially planar extending portion for extending through the through hole from the component side of the mounting bracket to an outside thereof, and (b) a locking portion for fitting in the recessed portion of the mounting bracket to prevent further movement of the locking bracket in a direction from the component side thereof to the outside thereof.

DETAILED DESCRIPTION OF THE PREFERRED EMBODIMENT

The present invention features a universal radio installation kit having a keying structure for positively locking the intermediate (or locking) bracket to the mounting (radio) bracket. This keying structure may comprise a planar recess in the radio side of the mounting bracket and a corresponding tab structure on the end of the locking bracket. Alternatively, the keying structure may include a notched keyway passing through the mounting bracket and a corresponding key on the locking bracket. In the present embodiment, both types of structures have been adopted in order to ensure an extremely stable and accurate installation.

By disposing the keying structure on the radio side of the mounting bracket, the radio itself acts to restrain the locking bracket from movement toward the radio. At the same time, the configuration of the holes in the mounting bracket and the corresponding extending portion of the locking bracket ensure little or no movement in any other direction.

It can be appreciated that since the mounting kit according to the present invention essentially comprises only matable plastic pieces, manufacturing and production are greatly simplified, and the installation process itself is quite convenient for persons of even limited skill.

Figure 1:
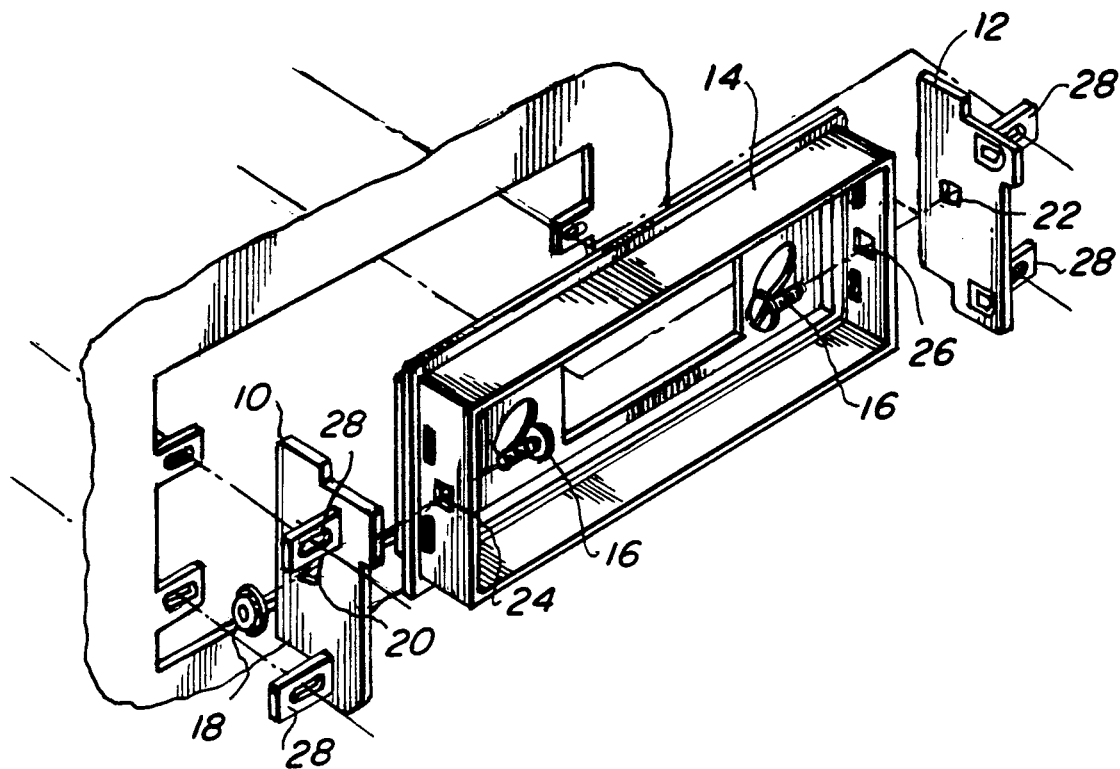
FIG. 1 is a perspective view of two side brackets according to the present invention being installed between a radio housing and the vehicle dashboard.

FIG. 1 is a perspective view showing two side brackets according to the present invention being coupled to a radio housing. As used herein, the term "radio" encompasses such electronic components as a radio tuner, a citizen's band radio, a compact disc player, a tape player, a fader, navigational equipment, telephones, and other known accessories capable of being mounted within the dash of a vehicle such as an automobile, a boat, an airplane, a motorcycle, a snowmobile, etc. The term "radio" also includes, where appropriate, installation brackets which may be coupled between the radio tuner itself and the mounting brackets (FIGS. 1 and 2 depict such an installation bracket).

In FIG. 1, left and right mounting brackets 10 and 12 are affixed to the radio housing 14 using any known and reasonably convenient means such as nut 16 and a bolt 18 passing through openings 20 and 22 in the mounting brackets and holes 24 and 26 in the radio housing. Locking brackets 28 (to be described in detail later) are installed in the left and right mounting brackets 10,12 by passing the locking brackets 28 from the radio side of the mounting brackets 10,12 to the outside thereof. Each locking bracket 28 has a generally L-shaped cross-section and the bottom portion of the "L" fits within a corresponding recess on the radio side of each mounting bracket 10,12.

Figure 2:
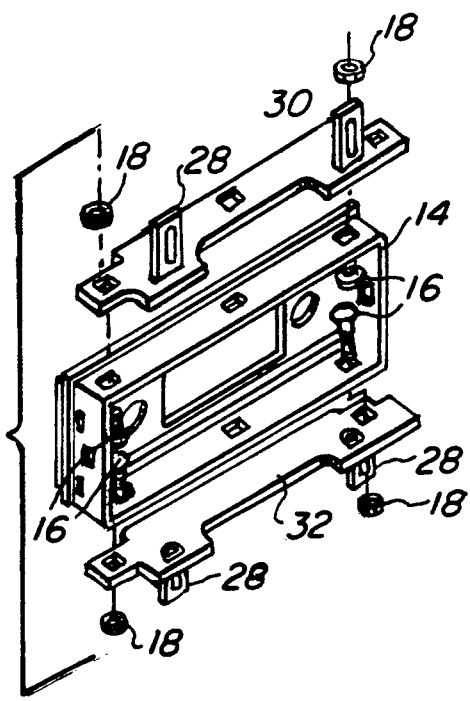
FIG. 2 is a perspective view showing top and bottom mounting brackets according to the present invention being installed between a radio housing and the vehicle dashboard.

FIG. 2 is a perspective view showing top and bottom mounting brackets 30,32 being installed on radio housing 14. Again, nuts 16 and bolts 18 may be used to fix the mounting brackets 30,32 to radio housing 14, while locking brackets 28 are installed in and extend from the top and bottom mounting brackets 30,32.

Figure 3:
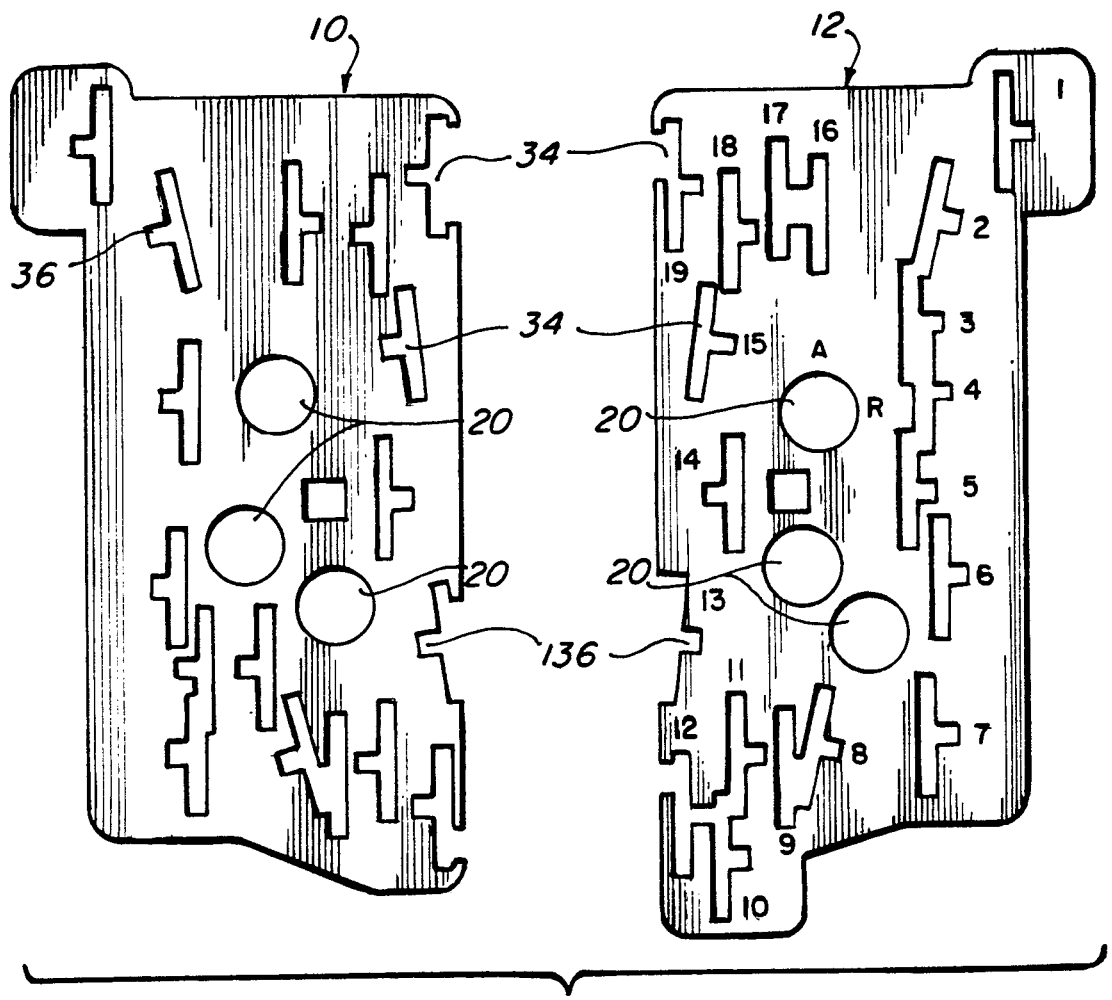
FIG. 3 is a plan view of left and right side brackets according to the present invention.

FIG. 3 comprises plan views of exemplary left and right side brackets 10,12. It should be noted that the mounting brackets 10,12 are not exactly symmetrical, although the side brackets for a particular model car may be symmetrical or non-symmetrical, as required. Since a plurality of side and top brackets are provided in each universal kit according to the present invention, proper side and top brackets can be chosen for the particular model vehicle in which the radio will be installed.

In FIG. 3, holes 20 are adapted for securing the side mounting brackets 10,12 to the radio housing. Of course, these holes 20 may be circular, square, or any other shape necessary to couple the mounting bracket to the radio housing. Holes 20 are also provided to lighten the weight of the mounting bracket, and/or provide clearance for structures on the radio housing or inside the vehicle. In fact, the mounting bracket may be provided with support structures such as rails, protrusions, indentations, etc. to support and ensure a secure fit of the mounting bracket between the radio housing and the vehicle brackets.

Each side mounting bracket 10,12 includes a plurality of apertures 34 passing through the mounting bracket from a radio side thereof to an outside thereof. Each aperture 34 may include a keyway 36 to mate with a corresponding key structure on the locking brackets 28 (to be described later). The keyway 36 acts to prevent movement of the locking bracket 28 within the aperture 34 thus ensuring a stable and secure fit between the locking bracket 28 and each side mounting bracket 10,12. Each aperture also includes a recessed portion (to be described later) which is adapted to mate with a corresponding tab on the locking bracket.

In FIG. 3, it is noticeable that at least one aperture 34 in each bracket 10,12 is disposed at an angle with respect to at least one other aperture 34. This is because different vehicle dashboards have brackets therein disposed at different angles, and the mounting brackets 10,12 of FIG. 3 are adapted to fit all such vehicle brackets. This enhances the flexibility of the design according to the present invention and allows the installation kit to be used with a great variety of vehicles.

FIG. 3 also depicts that each aperture 34 in mounting bracket 12 is encoded with a unique designator. Each designator indicates the location at which a locking bracket 28 should be installed for a particular make and/or model of vehicle. For example, if mounting bracket 12 were to be used with a Pontiac TM A-6000 1988-1986 vehicle, a locking bracket would be installed in each of the apertures designated by the numbers 15 and 13. By the use of such designators, any person can quickly and easily adapt a mounting bracket according to the present invention to a particular vehicle type. The designators in the preferred embodiment are raised letters and numbers, as is well-known in the plastic injection field. However, such designators may be small depressions in the surface of the mounting bracket, painted-on designators, decals, or any other known structure for designating a particular aperture. Preferably, each side, top, and bottom mounting bracket according to the present invention has designators for each aperture 34.

Figure 4:
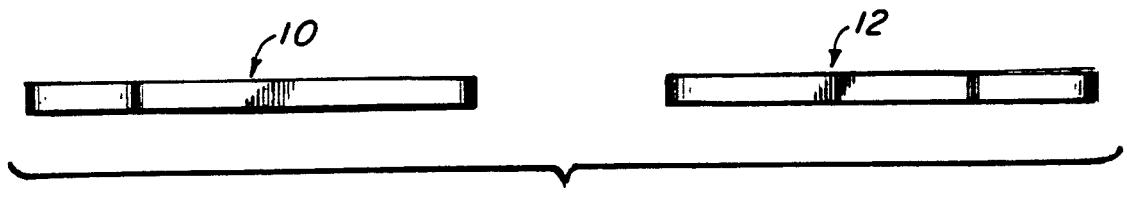
FIG. 4 is a elevation view of the FIG. 3 brackets.

FIG. 4 comprises elevational views of the mounting brackets 10,12 of FIG. 3 to provide some idea of the dimensions thereof. Preferably, the thickness of each mounting bracket is substantially ⅛-¼ inches. This thickness is designed to provide a strong structural support within the space available between the radio and the vehicle dashboard.

Figure 5:
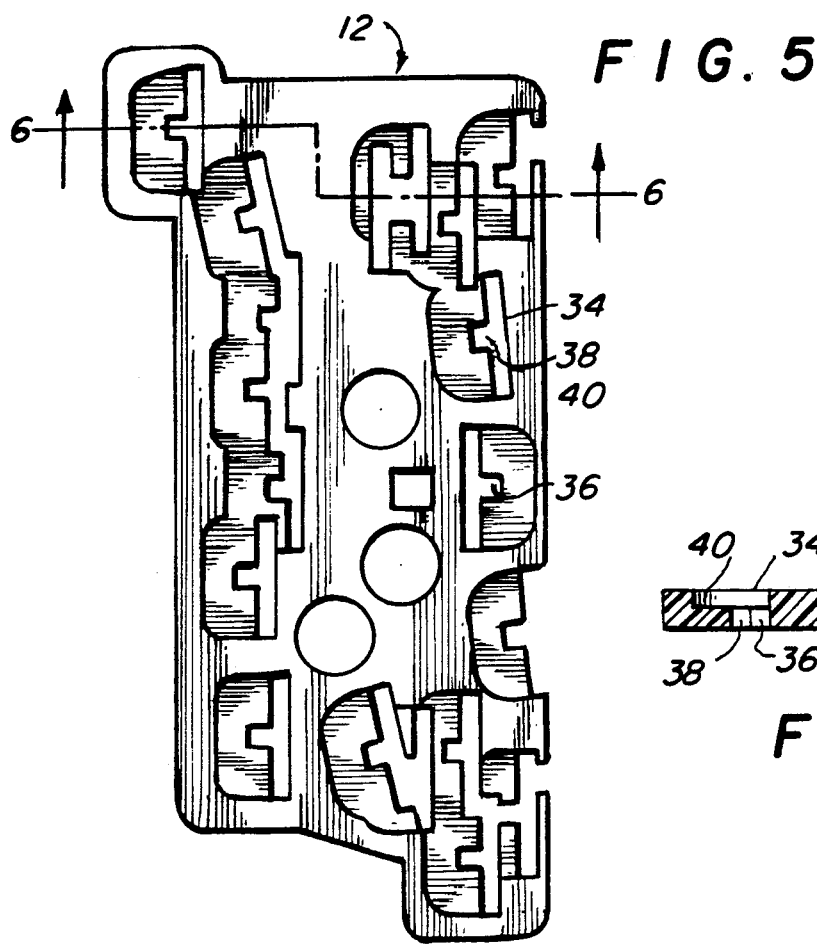
FIG. 5 is a plan view of the recessed side of one of the mounting, brackets shown in FIG. 3.
Figure 6:
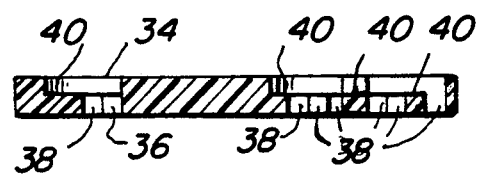
FIG. 6 is a cross-sectional view of the bracket shown in FIG. 5 taken along line 6—6.

FIG. 5 is a plan view of the radio side of the mounting bracket 12 of FIG. 3. FIG. 5 clearly shows that each aperture 34 comprises a through hole 38 and a recessed portion 40. As shown in FIG. 6, the recessed portion 40 has a thickness approximately equal to one half of the thickness of the mounting bracket 12. In FIG. 5, each recessed portion 40 has a generally D-shaped profile. This shape is chosen in order to provide a strong tab-like structure which can prevent movement of the locking bracket 28 relative to the mounting bracket 12. Of course, those of skill in this field recognize that many other shapes for recessed portion 40 may be adapted such as linear, curvilinear, star-shaped, etc. Also, it should be noted that the recessed portion 40 may extend from the left or right side of through hole 38, or may extend on both sides thereof. Also, while the recessed portion 40 is depicted as being generally planar in extend and parallel to the plane of mounting bracket 12, other structures may be adopted within the scope of the present invention. For example, the recessed portion 40 may comprise a series of steps, a curved cross-section, a sloping cross-section, or a series of undulations. Further, the recessed portion 40 may extend almost entirely through the thickness of mounting bracket 12, or may extend only a small way into the surface thereof. Furthermore, it is not necessary that two side brackets and a top and bottom bracket be used for each installation. In fact, for an installation in a Chevy Impala/Caprice TM, 1990-85, only a single (top) bracket is used. Nevertheless, the universal kit according to the present invention may include a plurality of side brackets, a plurality of top brackets, and a plurality of bottom brackets in order for the kit to be adapted to an entire class of vehicles, such as for all General Motors' vehicles.

Figure 7:
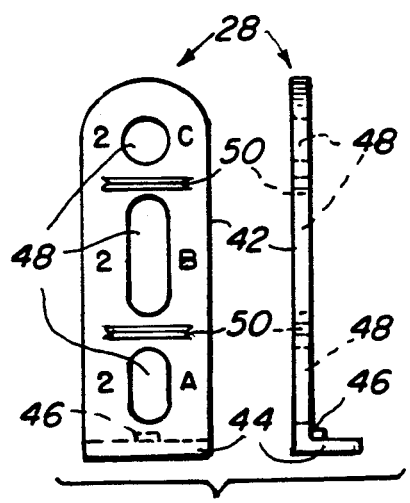
FIG. 7 comprises rear and side views of a first type of locking bracket.
Figure 8:
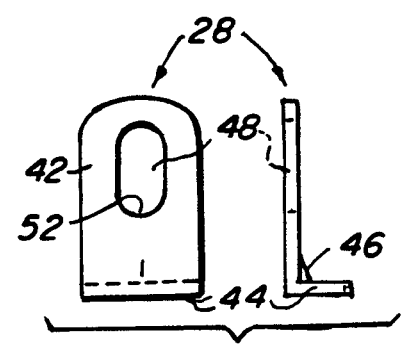
FIG. 8 comprises rear and side views of a second type of locking bracket.

FIGS. 7 and 8 comprise back and side views of a tall and a short locking bracket 28, respectively. In FIG. 7, the tall locking bracket 28 comprises a generally planar extending portion 42 and a locking portion 44. The locking bracket 28 thus presents a L-shaped cross-section wherein the bottom leg 44 is adapted to fit within recessed portion 40. Thus, the locking portion 44 acts as a key to secure the locking bracket 28 to the mounting bracket 12. The mounting bracket 28 may also include a further key structure 46 extending between the extending portion 42 and the locking portion 44. The key structure 46 is adapted to slide within the notch keyway 36 within an aperture 34. This key structure 46 further enhances the structural stability of the installation.

FIG. 7 also shows that each locking bracket 28 has one or more holes 48 adapted to be coupled to corresponding structure within the vehicle dashboard. For example, the holes 48 may be used with a screw or a nut and bolt assembly to couple the locking bracket 28 to the vehicle dashboard structure. Note that some holes 48 are elongated in order to provide coupling for different dashboard structures.

FIG. 7 also depicts frangible portions 50 which may be used to break away different lengths of bracket 28 in order to couple to different vehicle dashboard structures. Preferably, the frangible portions 50 are reduced in thickness in order to allow breakage along a longitudinal axis thereof while still retaining structural strength in the un-broken portions. Note that the portion of the bracket which is reduced in thickness does not extend to the sides of the bracket 28.

In FIG. 7, locking portion 44 of bracket 28 has a shape adapted to fit within the D-shaped recesses 40 in mounting bracket 12. Also, the locking portion 44 is designed to have a thickness substantially the same as the depth of recessed portion 40 so that the bottom side of locking portion 44 will be flush with the radio side of mounting bracket 12 when the locking bracket 28 is inserted therein.

FIG. 8 comprises back and side views of a short locking bracket 28 and has features generally similar to those described above with respect to FIG. 7. Note that keying structure 46 may comprise a triangular-shaped cross-section structure rather than the rectangular structure depicted in FIG. 7. Also, a key 52 may be provided at one or both ends of hole 48 in order to restrict the travel of a bolt within the hole 48. Such structures and their functions are well known to persons of skill in this field and need not be described further herein.

In use, the installer first determines his vehicle make, model, and year. He then consults the installation kit instructions to determine which side, top, and/or bottom mounting brackets should be used with his vehicle. He also determines the number and type of locking brackets necessary. Then, the installer inserts the appropriate locking brackets into the designated apertures in the mounting brackets, according to the instructions provided with the kit. Then, the mounting brackets are affixed to the radio housing with, for example, screws and/or nuts and bolts. Then, the assembled radio and bracket assembly is inserted into the dashboard of the vehicle and secured therein using screws mounted through the holes in the locking brackets. Lastly, face plates, knobs, etc. may be attached to the radio, as required.

Preferably, both the mounting brackets and the locking brackets are made of a plastic material in an injection molding process. However, those of skill in this field readily understand that alternative materials and methods may be used, for example, stamped metal parts, composites, etc.

Thus, what has been described is a universal installation kit which is easy to manufacture, easy to install, and provides a safe and secure mounting for the radio within the vehicle dashboard. While the present invention has been described with respect to what is presently believed to be the most practical and preferred embodiment, it is to be understood that the invention is not limited thereto. Specifically, the invention is intended to cover various modifications and equivalents structures and functions. For example, the locking brackets may be fixed relative to the mounting brackets using the described recessed portions and/or keyways. Alternatively, the locking bracket may be fixed with respect to the mounting bracket using keyed flanges, tabs, protrusions, etc. The keyed structure may extend parallel to the longitudinal axis of the locking bracket, or orthogonal thereto. Also, the keying structures described above may be reversed such that a notch is provided in the locking bracket while a corresponding protrusion is provided on the mounting bracket. Such equivalent structures are well known to those of skill in the field and need not be described in further detail.

I claim:

1. A keyed mounting kit for mounting a radio or the like to support brackets in a vehicle, comprising:
    at least one mounting bracket having a hole therein for attachment to the radio, said bracket having a plurality of apertures each passing therethrough a locking member, each aperture including a key structure for mating with a corresponding key structure on said locking member; and
    a plurality of locking members each passing through a corresponding aperture of said at least one mounting bracket from a radio-side of said bracket member to an outside thereof in a direction normal to a plane of said at least one mounting bracket, each locking member having a key structure for mating with the corresponding key structure of said bracket member.

2. A kit according to claim 1, wherein said mounting bracket key structure comprises a recessed area in said at least one radio-side of said bracket member, said recessed area extending two dimensionally in a plane parallel to the sides of said bracket member.

3. A kit according to claim 2, wherein each locking member comprises a single piece of plastic having a substantially L-shaped cross-section, a shorter leg of said L-shaped cross-section comprising said locking member key structure.

4. A kit according to claim 1, wherein said mounting bracket key structure comprises a notch in said aperture, said notch extending from said radio-side to said at least one outside of said bracket member.

5. A kit according to claim 1, wherein said at least one bracket member includes at least one aperture disposed at an angle with respect to at least one other aperture.

6. A keyed mounting kit for mounting a radio or the like to support brackets in a vehicle comprising:
    at least one mounting bracket having a hole therein for attachment to the radio, said bracket having a plurality of apertures each for passing therethrough a locking member, each aperture including a key structure for mating with a corresponding key structure on said locking member; and
    a plurality of locking members each for passing through a corresponding aperture of said at least one mounting bracket from a radio-side of said bracket member to an outside thereof, each locking member having a key structure for mating with the corresponding key structure of said bracket member,
    wherein each locking member comprises an extending portion for extending through said aperture, and wherein said locking member key structure comprises a ridge formed on said extending portion.

7. Apparatus for mounting a communications device to a vehicle, comprising:
    a substantially planar mounting bracket having a hole therein for connection to the device, said mounting bracket having a plurality of openings each capable of passing therethrough a locking bracket, each opening having a through portion and a key portion, said key portion being disposed adjacent a radio-side of said mounting bracket; and
    at least one locking bracket having a hole therein for connection to the vehicle, said locking bracket having (a) an extending portion passing through said through portion in said opening, and (b) a locking portion for mating with said key portion of said opening, said mounting bracket hole comprising an elongated aperture for preventing substantial movement of said locking bracket in any direction parallel to a plane of said mounting bracket.

8. Apparatus according to claim 7, wherein said locking bracket comprises a single plastic piece having a substantially planar extending portion with at least one locking bracket hole therein.

9. Apparatus according to claim 7, wherein said locking portion and said key portion both have matching D-shaped outlines.

10. Apparatus according to claim 7, wherein said key portion comprises a recessed portion having a depth substantially one half of a thickness of said mounting bracket, and wherein said locking portion has a thickness substantially equal to the recessed portion depth.

11. Apparatus according to claim 7, wherein said mounting bracket has the plurality of opening which are disposed at different angles with respect to each other for mounting the device to a plurality of different type vehicles.

12. Apparatus for mounting a communications device to a vehicle, comprising:
    a substantially planar mounting bracket having a hole therein for connection to the device, said mounting bracket having a plurality of openings each capable of passing therethrough a locking bracket, each opening having a through portion and a key portion, said key portion being disposed adjacent a radio-side of said mounting bracket; and
    at least one locking bracket having a hole therein for connection to the vehicle, said locking bracket having (a) an extending portion for passing through said portion in said opening, and (b) a locking portion for mating with said key portion of said opening, said at least one locking bracket comprises an integral structure having a substantially L-shaped cross-section with a planar extending portion, said extending portion having a plurality of holes therein and a frangible section of reduced thickness disposed between two of said holes.

13. Apparatus for mounting a communication device to a vehicle, comprising:
    a substantially planar mounting bracket having a hole therein for connection to the device, said mounting bracket having a plurality of openings each capable of passing therethrough a locking bracket, each opening having a through portion and a key portion, said key portion being disposed adjacent a radio-side of said mounting bracket; and
    at least one locking bracket having a hole therein for connection to the vehicle, said locking bracket having (a) an extending portion for passing through said portion in said opening, and (b) a locking portion for mating with said key portion of said opening.
    wherein said mounting bracket has a keying notch in the through portion of each opening, and wherein said locking bracket has a key extending from said locking portion to said extending portion and matable with said keying notch.

14. A universal mounting kit for mounting an electronics component to a plurality of different vehicle types, comprising:
    a plurality of substantially planar mounting brackets each bracket having a plurality of apertures, at least one bracket having apertures located to couple said bracket to at least two different vehicle types, each aperture having (a) a through hole, and (b) a key portion adjacent a component side of said bracket, each said through hole being entirely contained within a mounting bracket; and
    a plurality of locking brackets each bracket having (a) a substantially planar extending portion extending through said hole from the component side of said mounting bracket to an outside thereof, and (b) a locking portion for mating with said key portion to prevent further movement of said locking bracket in a direction from the component side of said mounting bracket to the outside thereof.

15. A kit according to claim 14, wherein said mounting and locking brackets each comprise an integral piece of plastic.

16. A kit according to claim 14, wherein said at least one mounting bracket apertures are disposed at different angles for coupling that bracket to the two different vehicle types.

17. A kit according to claim 14, wherein said key portion comprises a recess portion, and wherein said recessed portion and said locking portion each have a predetermined thickness to cause a bottom side of said locking portion to be substantially flush with the component-side surface of said mounting bracket.

18. A universal mounting key for mounting an electronics component to a plurality of different vehicle types, comprising:
    a plurality of substantially planar mounting brackets each bracket having a plurality of apertures, at least one bracket having apertures located to couple said bracket to at least two different vehicle types, each aperture having (a) a through hole, and (b) a key portion adjacent a component side of said bracket; and
    a plurality of locking brackets each bracket having (a) a substantially planar extending portion for extending through said hole from the component side of said mounting bracket to an outside thereof, and (b) a locking portion for mating said key portion to prevent further movement of said locking bracket in a direction from the component side of said mounting bracket to the outside thereof,
    wherein each locking bracket has a substantially L-shaped cross-section with planar extending and locking portions, said locking portion having substantially D-shaped profile, the extending portion of at least one locking bracket having a plurality of holes therein with a frangible portion of reduced thickness extending between two of the holes.

19. A universal mounting key for mounting an electronics component to a plurality of different vehicle types, comprising:
    a plurality of substantially planar mounting brackets each bracket having a plurality of apertures, at least one bracket having apertures located to couple said bracket to at least two different vehicle types, each aperture having (a) a through hole, and (b) a key portion adjacent a component side of said bracket; and
    a plurality of locking brackets each bracket having (a) a substantially planar extending portion for extending through said hole from the component side of said mounting bracket to an outside thereof, and (b) a locking portion for mating with said key portion to prevent further movement of said locking bracket in a direction from the component side of said mounting bracket to the outside thereof.
    wherein at least one further mounting bracket includes a plurality of designators associated with a corresponding plurality of apertures, the designators corresponding to different vehicle types.

20. A universal mounting key for mounting an electronics component to a plurality of different vehicle types, comprising:
    a plurality of substantially planar mounting brackets each bracket having a plurality of apertures, at least one bracket having apertures located to couple said bracket to at least two different vehicle types, each aperture having (a) a through hole, and (b) a key portion adjacent a component side of said bracket; and
    a plurality of locking brackets each bracket having (a) a substantially planar extending portion for extending through said hole from the component side of said mounting bracket to an outside thereof, and (b) a locking portion for mating with said key portion to prevent further movement of said locking bracket in a direction from the component side of said mounting bracket to the outside thereof.
    wherein said through hole has a rectangular profile with a keyway disposed on one side thereof, and wherein side locking bracket includes a key, adjacent said extending portion, for extending said keyway.

* * * * *